Sept. 15, 1936.  R. T. BACKUS ET AL  2,054,475
BOAT PROPELLER BEARING
Filed March 14, 1936
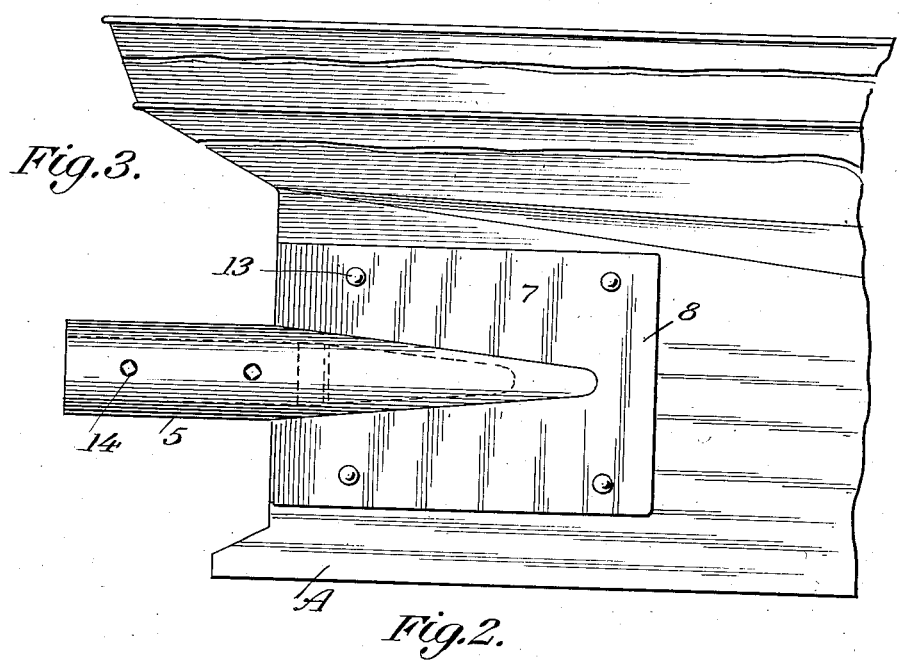
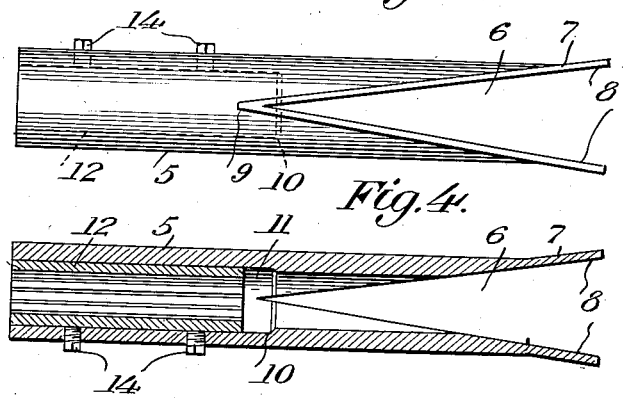
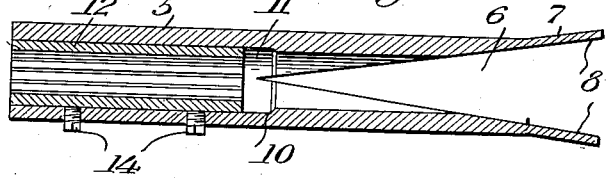
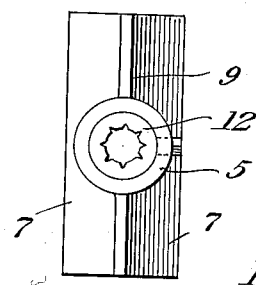
Rodman T. Backus
Frank Lewis Pollard
INVENTORS
BY Victor J. Evans & Co.
ATTORNEYS Patented Sept. 15, 1936

2,054,475

UNITED STATES PATENT OFFICE 2,054,475

BOAT PROPELLER BEARING

Rodman T. Backus and Frank Lewis Pollard,
Fort Pierce, Fla.

Application March 14, 1936, Serial No. 68,964

1 Claim. (Cl. 308—15)

The invention relates to a boat propeller bearing and more especially to a stream lined stern bearing designed to replace the stern bearings and struts now being used on motor or steam propelled vessels.

The primary object of the invention is the provision of a bearing of this character, wherein the proportion thereof varies according to the size of the propeller shaft and when fastened in place will allow free passage of water to the propeller and is adapted to accommodate any character of packing and in use will increase the speed of travel of any vessel as the water is free to pass to the propeller as there is no dead water aft of the keel of the vessel.

Another object of the invention is the provision of a bearing of this character, wherein maximum safety is assured as there is no liability of danger of its coming off due to the fact that it is mortised into the dead wood and riveted thereto, there being no leg screws employed for the fastening of the bearing in place and is relieved of vibration and has maximum longevity.

A further object of the invention is the provision of a bearing of this character, which is simple in construction, thoroughly reliable and effective in its operation, strong, durable, and inexpensive to manufacture and install.

With these and other objects in view, the invention consists in the features of construction, combination and arrangement of parts as will be hereinafter more fully described, illustrated in the accompanying drawing, which discloses the preferred embodiment of the invention and pointed out in the claim hereunto appended.

In the accompanying drawing:

Figure 1 is an end elevation of the bearing constructed in accordance with the invention.

Figure 2 is a top plan view thereof.

Figure 3 is a fragmentary elevation of the stern end of a vessel showing the bearing fitted therewith and in side elevation.

Figure 4 is a horizontal sectional view taken longitudinally of the bearing.

Similar reference characters indicate corresponding parts throughout the several views in the drawing.

Referring to the drawing in detail, A designates generally a skeg of a water craft such as a boat or the like and fitted with this skeg A is the bearing constituting the present invention and hereinafter fully described.

The bearing comprises a cylindrical body 5 made from metal although it may be made from any other suitable material and constitutes a hub for a propeller shaft. At the longitudinal axis of the cylindrical body and opening through one end thereof is a V-shaped gap or opening 6, it being walled by a forwardly convergent flat plate 7 having the separated portions 8 on opposite sides of the V-shaped gap 6 merging therewith at the longitudinal center of said plates. The plates 7 extend a considerable distance into the body 5 and meet each other at 9, the bore through the body 5 being carried into the gap 6 and this bore has an annular step 10 creating in the outer portion of said body a space 11 for a bushing, stuffing box, packing or the like 12.

The plates 7 are mortised in the skeg A at opposite sides thereof and are riveted at 13 thereto.

In one side of the body 5 and accommodated in suitable openings leading to the space 11 are screw plugs 14 which serve to hold the part 12 in place. The propeller shaft (not shown) is passed through the part 12 contained within the body 5 and due to the formation of the bearing hereinbefore described there can be no dead water aft of the keel so that no resistance can be set up by such dead water to retard the movement of the vessel. The bearing is stream lined in formation and thereby offers very little if any actual resistance to the travel of the vessel or boat. The bearing is supported according to the requirements in the use thereof in any suitable manner.

It is, of course, understood that the skeg aft is of the tapered formation corresponding to the V-shaped gap 6 between the plates 7 and the size of the body 5 varies according to the cross sectional size of the propeller shaft to be accommodated thereby.

What is claimed is:

A bearing of the kind described comprising a pair of relatively wide elongated plates arranged in outwardly convergent relation to each other and integrally joined one with the other at the outer end edges thereof for effecting a gap accommodating a skeg of a water craft, a cylindrical body forming a hub extending from the longitudinal center of said plates beyond the joined end edges thereof and having a longitudinally split inner end for straddling the said plate, the split portions of the inner end of said body being inwardly tapered and merging with the said plates externally thereof, the said body being formed with an enlarged annular portion interiorly thereof and forming a bore therethrough for a distance of the same, and a bushing fitting said annular enlarged portion for encircling a shaft when inserted through the bore in said body.

RODMAN T. BACKUS.
FRANK LEWIS POLLARD.